US007593345B2

United States Patent
Dubé et al.

(10) Patent No.: US 7,593,345 B2
(45) Date of Patent: Sep. 22, 2009

(54) ALTERING LATENCY FOR NETWORK TESTING

(75) Inventors: Jean-François Dubé, Santa Clara, CA (US); Christopher J Cicchetti, Portola Valley, CA (US); Geoffrey T Hibbert, San Jose, CA (US)

(73) Assignee: Finisar Corporation, Sunnyvale, CA (US)

(*) Notice: Subject to any disclaimer, the term of this patent is extended or adjusted under 35 U.S.C. 154(b) by 552 days.

(21) Appl. No.: 11/226,008

(22) Filed: Sep. 14, 2005

(65) Prior Publication Data

US 2006/0146722 A1 Jul. 6, 2006

Related U.S. Application Data

(60) Provisional application No. 60/640,407, filed on Dec. 30, 2004.

(51) Int. Cl.
*G08C 15/00* (2006.01)
(52) U.S. Cl. .................. 370/241; 370/229; 370/230; 370/235; 370/236
(58) Field of Classification Search ............. 370/230.1, 370/241, 328, 503, 229, 230, 231, 232, 233, 370/234, 235, 235.1, 236, 236.1, 237, 238, 370/241.1, 252, 253, 412, 418, 428, 429, 370/508, 516, 517, 519; 714/1, 2, 18, 748, 714/749, 750; 398/43, 52, 53, 102; 73/1.01, 73/1.42
See application file for complete search history.

(56) References Cited

U.S. PATENT DOCUMENTS

| | | | | |
|---|---|---|---|---|
| 6,067,606 A | * | 5/2000 | Holscher et al. | ............ 711/167 |
| 6,298,407 B1 | * | 10/2001 | Davis et al. | ................ 710/314 |
| 6,304,923 B1 | * | 10/2001 | Klein | ......................... 710/41 |
| 6,330,286 B1 | * | 12/2001 | Lyons et al. | ........... 375/240.28 |
| 6,633,540 B1 | * | 10/2003 | Raisanen et al. | ......... 370/230.1 |
| 6,868,434 B1 | * | 3/2005 | Terranova et al. | ........... 709/203 |
| 7,349,670 B2 | * | 3/2008 | Mlinarsky et al. | ........ 455/67.11 |
| 7,366,790 B1 | * | 4/2008 | Rustad et al. | ................ 709/235 |
| 7,373,438 B1 | * | 5/2008 | DeBergalis et al. | ........... 710/40 |
| 2002/0147937 A1 | * | 10/2002 | Wolf | .............................. 714/4 |
| 2003/0079005 A1 | * | 4/2003 | Myers et al. | ................. 709/223 |
| 2004/0057381 A1 | * | 3/2004 | Tseng et al. | ................. 370/238 |
| 2004/0088605 A1 | * | 5/2004 | Nakamoto et al. | ............ 714/43 |

(Continued)

OTHER PUBLICATIONS

*Spirent Communications™ Enables SAN Developers to Fine Tune Performance with its Gigabit Ethernet Network Impairment Emulator*; http://web.archive.org/web/20011118143358/spirentcom.com/news/prdetail.asp?id=19; Dated Oct. 8, 2001; 2 pages.

(Continued)

*Primary Examiner*—Aung S Moe
*Assistant Examiner*—Abdullah Riyami
(74) *Attorney, Agent, or Firm*—Workman Nydegger

(57) ABSTRACT

Systems and methods for altering a latency of network messages. A latency control system is configured to alter the latency of one or more network messages transmitted in a network. The latency of the network messages may simulate a latency associated with a network connection. A message queue is controlled by the latency control system to implement the latency, which can be increased or decreased. The latency may be increased and/or decreased dynamically.

13 Claims, 10 Drawing Sheets

U.S. PATENT DOCUMENTS

| | | | |
|---|---|---|---|
| 2004/0117474 A1* | 6/2004 | Ginkel et al. | 709/224 |
| 2004/0117791 A1* | 6/2004 | Prasad et al. | 718/100 |
| 2004/0223566 A1* | 11/2004 | Yamashita | 375/354 |
| 2004/0225736 A1* | 11/2004 | Raphael | 709/226 |
| 2004/0260831 A1* | 12/2004 | Dyck et al. | 709/233 |
| 2005/0156646 A1* | 7/2005 | Liou | 327/276 |
| 2005/0232307 A1* | 10/2005 | Andersson et al. | 370/503 |
| 2006/0007878 A1* | 1/2006 | Xu et al. | 370/328 |
| 2006/0029096 A1* | 2/2006 | Babbar et al. | 370/466 |
| 2006/0072628 A1* | 4/2006 | Liu et al. | 370/516 |
| 2006/0077950 A1* | 4/2006 | Gallagher et al. | 370/351 |
| 2006/0104281 A1* | 5/2006 | Scarr et al. | 370/395.1 |
| 2007/0010898 A1* | 1/2007 | Hosek et al. | 700/2 |
| 2007/0100473 A1* | 5/2007 | Shvodian et al. | 700/19 |
| 2007/0131019 A1* | 6/2007 | Greidanus et al. | 73/1.42 |
| 2008/0005354 A1* | 1/2008 | Kryskow et al. | 709/238 |

OTHER PUBLICATIONS

*Adtech AX/4000 Gigabit Ethernet Network Impairment Emulator (GENIE)*; Dated 2001; 2 pages.

*Spirent Communications Fibre Channel Over IP Testing Solution Adopted by SAN Valley Systems*; Dated Jan. 16, 2002; 3 pages.

*Impairment Emulation*; http://web.archive.org/web/20030820231159/www.spirentcom.com/analysis/technology.cfm?WS=31&SS=147&wt=1; 2 pages.

* cited by examiner

ALTERING LATENCY FOR NETWORK TESTING

CROSS-REFERENCE TO RELATED APPLICATIONS

This application claims priority to and the benefit of U.S. Provisional Patent Application Ser. No. 60/640,407, filed Dec. 30, 2004 and entitled ALTERING LATENCY FOR NETWORK TESTING, which is incorporated by reference.

BACKGROUND OF THE INVENTION

1. Field of the Invention

The present invention relates generally to testing networking systems. More particularly, embodiments of the invention relate to systems and methods for altering latency to test data transmission systems and components.

2. Background Technology

Communication networks—including wide area networks ("WANs"), local area networks ("LANs"), metropolitan area networks ("MANs"), and storage area networks ("SANs")—allow increased productivity and use of distributed computers. Moreover, network applications such as electronic mail, voice and data transfer, host access, and shared and distributed databases are increasingly used as a means to increase user productivity using communications networks.

Many different physical configurations of networks presently exist. Examples include Gigabit Ethernet ("GE"), 10 GE, Fiber Distributed Data Interface ("FDDI"), Fibre Channel ("FC"), Serial Attached SCSI (SAS) and Serial ATA (SATA), Synchronous Optical Network ("SONET") and InfiniBand networks. These networks, and others, typically conform to one of a variety of established standards, or protocols, which set forth rules that govern network access as well as communications between and among the network resources.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

Consequently, as high speed data communications systems, processes and devices mature, many designs have increasingly focused on reliability and performance issues. Accordingly, a number of diagnostic devices (e.g., protocol analyzers, generators, bit error rate testers, jammers) and tests can be utilized to aid a network administrator in both identifying existing network conditions that are causing a network to deviate from expected performance and proactively identifying network conditions that may cause a network to deviate from expected performance in the future.

When adding new devices to an existing network or installing an entirely new network of devices, a network administrator may use many of these diagnostic devices to ensure the quality of the network. Unfortunately, the network administrator may wish to install these network devices miles away from each other—even tens, hundreds, or thousands of miles away from each other. To test these devices, a network administrator could travel from location to location to make modifications to the network. However, the network administrator would incur the associated travel expenses, which can be expensive. Also, the network administrator might waste hours or even days traveling, which the network administrator could have spent testing the network. In fact, even when the devices are a relatively short distance apart, a network administrator may wish to make several minor modifications to several network devices—making shorter distances equally burdensome.

Because network devices may be installed in different locations, some network administrators could choose to interconnect network devices locally for testing before installing them remotely. However, to properly test using the latency associated with the lengths of a particular type of communications medium (such as, optical fiber), these network administrators might attempt to purchase spools of the communications medium to interconnect the devices being tested. Unfortunately, the supply of spools can be limited, and, at times, unavailable in the amounts necessary for testing. Even when available, the spools can be too expensive for many network administrators.

Similarly, prior to a product release, manufacturers of network devices may wish to test the performance of their devices in various environments—including at distances of tens, hundreds, or thousands of miles. For example, network device manufacturers may want to test timeout conditions. However, as mentioned above, the supply of spools can be insufficient and can be expensive. Further, to test a network device's performance at various distances, the manufacturer might waste hours of time assembling the varied lengths of connection medium—increasing the testing costs and delaying the release of their products to the public.

SUMMARY

A need therefore exists for systems and methods that reduce some of the above-described disadvantages and problems, reduce all of the above-described disadvantages and problems, and/or reduce other disadvantages and problems.

In one embodiment, a latency control system is used to provide variable latency. The latency control system controls the latency or delays the delivery of one or more network messages from a first node to a second node within the networking system. The latency control system may use, for example a circular buffer or a first in first out queue (FIFO) to control the desired latency. When the latency is altered, embodiments of the invention also ensure that the act of changing the latency complies with the appropriate protocol by inserting or removing appropriate data or messages from the buffer or queue, helping to ensure that the latency change itself doesn't cause protocol errors and disrupt the communication in unwanted ways.

The latency control system may be configured to simulate the latency associated with at least a portion of network. For example, the latency control system may be configured to simulate the latency associated with a length of communications medium, such as, one or more spools of optical fiber.

Accordingly, a person may perform various diagnostic procedures as if a particular network device were connected via the one or more spools of optical fiber.

The latency control system may be configured to dynamically increase and/or decrease the simulated latency. Advantageously, this may provide a generally seamless transition between various simulated latencies.

Additional features and advantages of the invention will be set forth in the description which follows, and in part will be obvious from the description, or may be learned by the practice of the invention. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of invention will be rendered by reference to specific embodiments thereof which are illustrated in the appended drawings. It is appreciated that these drawings depict only typical embodiments of the invention and are therefore not to be considered limiting of its scope. Embodiments of the invention will be described and explained with additional specificity and detail through the use of the accompanying drawings in which.

DETAILED DESCRIPTION OF THE PREFERRED EMBODIMENTS

Embodiments of the invention relate generally to networking systems, including the testing of high speed data transmission systems and components. Embodiments of the invention can alter the latency associated with the a network. This can advantageously overcome, for example, the problem of physically modifying a test cable.

Figure 1:
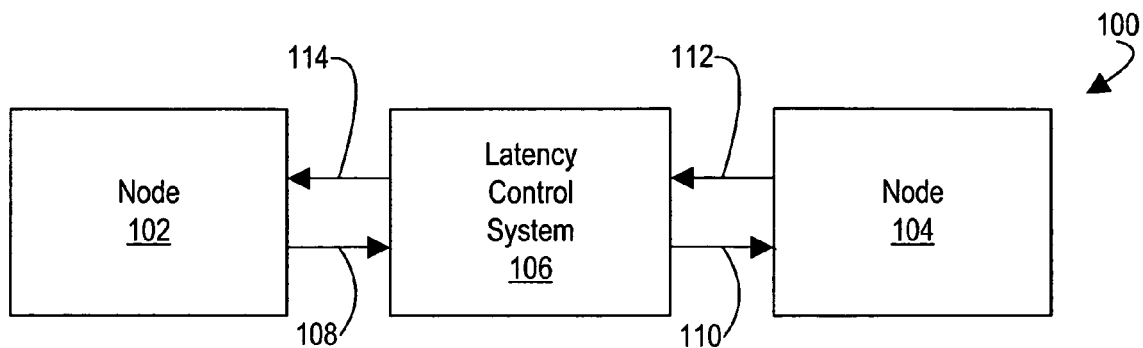
FIG. 1 is a block diagram of a networking system including a latency control system, according to an embodiment of the invention.

FIG. 1 is a block diagram of an exemplary networking system 100 including a latency control system. The networking system 100 may include one or more nodes, such as, a node 102 and a node 104. As used herein, a "node" includes, but is not limited to, a server or host, a client or storage device, a switch, a hub, a router, all or a portion of a SAN fabric, a diagnostic device, and any device (or any portion thereof) that may be coupled to a network and that may receive (and/or monitor) a signal over at least a portion of a network, send (and/or generate) a signal over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet, a datagram, a frame, a data frame, a command frame, an ordered set, any unit of binary data capable of being routed through a computer network, and the like or any combination thereof. In one exemplary embodiment, a network message may comprise 10-bit transmission characters be used for data purposes, protocol management purposes, code violation errors, and the like—such as, those used in certain embodiments of Fibre Channel. Also, in one exemplary embodiment, an ordered set may include, for example, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes, such as, the nodes 102 and 104, may communicate using any suitable network configuration and/or topology. Nodes, such as, the nodes 102 and 104, may communicate using any suitable network protocol or protocols, including, but not limited to, serial protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), and the like. Of course, nodes may use any other suitable protocol (or combination of protocols) and may communicate in any other suitable manner—depending on the particular purpose and/or configuration of the networking system 100.

As shown in FIG. 1, the networking system 100 may include one or more latency control systems (such as, a latency control system 106), which may be configured to communicate network messages among nodes. In one embodiment, the latency control system 106 may comprise one or more hardware modules, one or more software modules, or both. The latency control system 106 may receive a signal over at least a portion of a network, send a signal over at least a portion of a network, or both. Accordingly, using a signal, the latency control system 106 may receive one or more network messages from a node, send one or more network messages to a node, or both.

For example, a node 102 may send (via a connection 108) a network message for the node 104, which network message the latency control system 106 may receive and may send (using a connection 110) to a node 104. Similarly, the node 104 may send (via a connection 112) a network message for the node 102, which network message the latency control system 106 may receive and may send (using a connection 114) to the node 102. The connections 108, 110, 112, and 114 may comprise any suitable type, number, and/or combination of connections, networks, and the like. Also, a latency control system may be configured to send network messages among two, three, or more nodes. Further, in one embodiment, a latency control system may be configured to send network messages from a first node to a second node, but not network messages from the second node to the first node.

The latency control system 106 may alter the latency of one or more network messages sent to and/or from nodes. For example, in one embodiment, the latency control system 106 may increase the latency of one or more network messages to simulate the latency associated with one or more portions of a network (such as, a length of optical fiber or of another communications medium) or the latency associated with an entire network. As previously stated, this enables the distance between nodes to be simulated and overcomes the problem of physically modifying the test connections 108, 110, 112, and 114.

By simulating the latency associated with a network, the latency control system 106 may provide many advantages. For example, a person (such as, a network administrator) may monitor, analyze, or otherwise test one or more nodes in a simulated environment without having to actually purchase or assemble the entire environment—thus reducing component costs, reducing assembly labor costs, reducing assembly time, and reducing testing costs. Also, as an example, a network administrator may use the latency control system 106 to interconnect the nodes within the same building (or even the same room) to simulate an environment of nodes that might otherwise be distributed over multiple remote locations—thus reducing or avoiding travel time, increasing testing efficiency, and reducing testing costs. It will be appreciated that the latency control system 106 may alter the latency of one or more network messages for any other suitable purpose.

Figure 2:
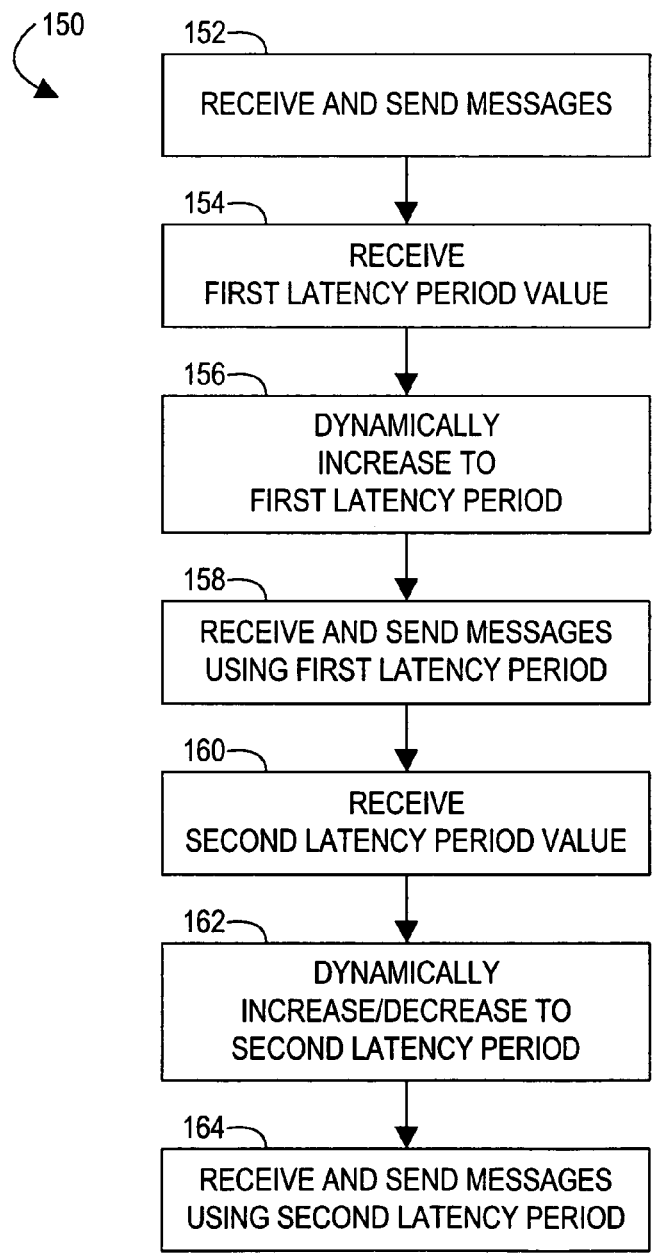
FIG. 2 is a flowchart illustrating an embodiment of a method, which may be used to alter the latency of one or more network messages.

FIG. 2 is a flowchart illustrating an exemplary embodiment of a method 150, which alters the latency of network messages sent to and/or from nodes. As shown in FIG. 2, the latency control system 106 may optionally receive and send network messages 152. The latency control system 106 may receive or otherwise access a first latency period value 154. The latency period value may be (or otherwise indicate) a latency period, such as, the length of time by which network messages should be delayed. In one embodiment, the latency period comprises an amount of time representing the latency associated with one or more portions of a network or with an entire network. In one embodiment, the latency period value may be (or otherwise indicate) a number or count of network messages or portions of network messages used to implement a desired latency period. A bandwidth or transmission rate (such as, number of bits per time period) associated with a given network, communications medium, and/or protocol may optionally be used to derive a desired latency period value.

The latency control system 106 may use the first latency period value to increase the latency 156 associated with one or more network messages in accordance with the latency period indicated by the first latency period value. The latency control system 106 may use the first latency period value to dynamically increase the latency 156 associated with one or more network messages. Thus, while continuing to receive and send network messages, the latency control system 106 may increase the latency of some or all of the network messages until a desired latency is reached.

In one embodiment, the latency control system 106 may alter the latency at once (that is, each network message sent would have either have substantially no added latency or would have the entire latency period added). In one embodiment, the latency control system 106 may alter the latency incrementally (that is, each successively received network message may have a greater, the same, or a lower latency than the previous network message until the desired latency period is reached).

The latency control system 106 may receive and send one or more network messages 158 with the latency control system 106 delaying sending those messages by the latency period of the first latency period value.

The latency control system 106 may optionally receive or otherwise access another, second latency period value 160. It will be appreciated that the second latency period value may indicate the same, a greater, or a smaller latency period than the latency period indicated by the first latency period value. The latency control system 106 may optionally use the second latency period value to increase (or decrease) the latency dynamically 162, at once, incrementally, and/or in another other suitable fashion. It will be appreciated that the second latency period value may indicate that substantially no latency period should be added. If so, the latency control system 106 may decrease the latency until substantially no latency is added.

The latency control system 106 may receive and send one or more network messages 164 with the latency control system 106 delaying sending those messages by the latency period of the second latency period value. In one embodiment, steps 160, 162 and 164 may be repeated—thus permitting the control system 106 to receive or otherwise access other latency period values 160, dynamically increase or decrease to the appropriate latency period 162, and receive and send one or more network messages 164.

Figure 3A:
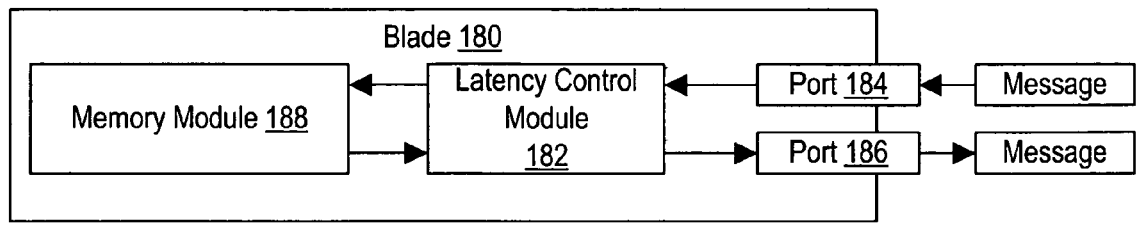
FIG. 3A is a block diagram of an embodiment of the latency control system shown in FIG. 1.

FIG. 3A is a block diagram of an embodiment of the latency control system 106 shown in FIG. 1. In one embodiment, the latency control system 106 may comprise a computer system architecture, which may include one or more blades. A blade (such as, a blade 180) may comprise one or more printed circuit boards. As shown in FIG. 3A, the blade 180 may include a latency control module 182. The latency control module 182 may comprise one or more hardware modules, one or more software modules, or both. In one embodiment, the latency control module 182 may comprise virtually any type of programmable circuit, such as, for example, a field programmable gate array ("FPGA"), a field programmable logic array ("FPLA"), a programmable logic array ("PLA"), or any programmable logic device.

In one embodiment, a latency control module may include circuitry and/or programming for implementing any of a plurality of network diagnostic functions (such as, a network analyzer, jammer, generator, a bit error rate tester, or the like) and/or any other suitable function and feature disclosed in U.S. patent application Ser. No. 10/769,202, entitled MULTI-PURPOSE NETWORKING DIAGNOSTIC MODULES and filed on Jan. 30, 2004, which is hereby incorporated by reference herein in its entirety.

As shown in FIG. 3A, the latency control module 182 may receive network messages via a port 184 and may send messages via a port 186. A port (such as, the ports 184 and 186) may include internal ports and external ports. Further, a port may be configured to receive a message (or portion thereof), to send a message (or portion thereof), or both. Indeed, a port may comprise any suitable interface through which a message may be transmitted and/or received.

As shown in FIG. 3A, the blade 180 may include one or more memory modules, such as, a memory module 188. In one embodiment, the latency control module 182 may buffer, queue, or otherwise store one or more received messages within the memory module 188—which messages the latency control module 182 may retrieve for sending after some or all of a latency period has expired or at any other suitable moment. A memory module may comprise any of a variety of memory, such as, for example, random access memory ("RAM").

Figure 3B:
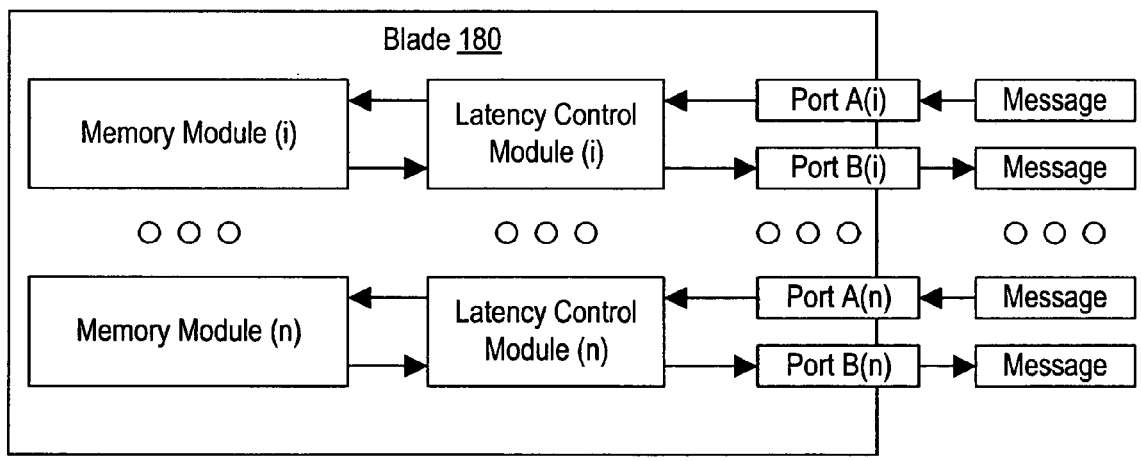
FIG. 3B is a block diagram of an embodiment of the latency control system shown in FIG. 1.

FIG. 3B is a block diagram of an embodiment of the latency control system 106 shown in FIG. 1. In the example of FIG. 3B, a blade (such as, the blade 180) may comprise one or more memory modules, one or more latency control modules, one or more pairs of ports, or any combination thereof.

Figure 3C:
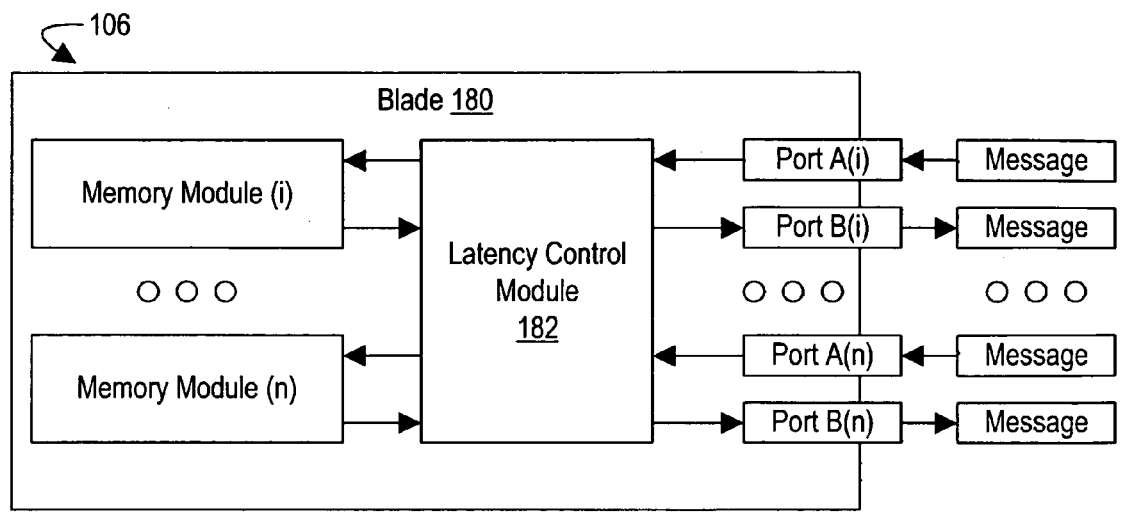
FIG. 3C is a block diagram of an embodiment of the latency control system shown in FIG. 1.

In one embodiment, a latency control module may be configured to interface with any suitable number of memory modules, ports, and the like. For example, FIG. 3C is a block diagram of an embodiment of the latency control system 106 shown in FIG. 1, illustrating that a latency control module (such as, the latency control module 182) may be configured to send and receive messages via one, two, or more ports (or pairs of ports). Further, as illustrated in FIG. 3C, a latency control module may be configured to buffer, queue, or otherwise store one or more received messages within one, two, or more memory modules, which messages the latency control module may retrieve for sending (for example) after some or all of a latency period has expired.

In one embodiment, a plurality of latency control modules may be configured to buffer, queue, or otherwise store one or more received messages within a shared memory module, which messages the plurality of latency control modules may retrieve for sending (for example) after some or all of a latency period has expired.

In some embodiments, two or more ports of a blade and/or a plurality of blades may be connected (or otherwise coupled) to leverage the capacity of a plurality of latency control modules and/or a plurality of memory modules.

Figure 3D:
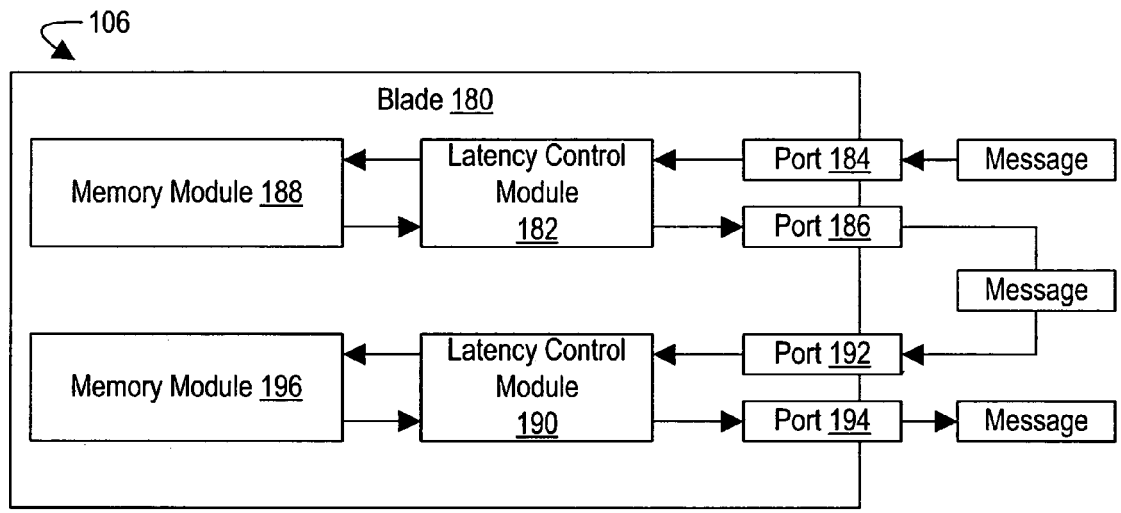
FIG. 3D is a block diagram of an embodiment of the latency control system shown in FIG. 1.

For example, FIG. 3D is a block diagram of an embodiment of the latency control system 106 shown in FIG. 1 and, illustrates that two or more ports of a blade may be may be connected. As shown in FIG. 3D, the blade 180 may include two or more ports (such as, ports 184, 186, 192, and 194); one, two, or more latency control modules (such as, latency control modules 182 and 190); and/or one, two, or more memory modules (such as, memory modules 188 and 196). Accordingly, the latency control module 182 may receive a message via the port 184, which may be connected (or otherwise coupled) to a first node. The latency control module 182 may store the message in the memory module 188, may retrieve the message from the memory module 188, and may send the message (after all or a portion of a latency period has elapsed) via the port 186. The port 186 may be connected (or otherwise coupled to) the port 192. Accordingly, the latency control module 190 may receive the message via the port 192, may store the message in the memory module 196, may retrieve the message from the memory module 196, and may send the message (after all or a portion of a latency period has elapsed) via the port 194, which may be connected (or otherwise coupled to) a second node. Thus, the latency of a message may be increased using a plurality of latency control modules and/or a plurality of memory modules of a blade. Of course, a blade may include any other suitable number of interconnected ports (or other devices) to link any other suitable number of memory modules and/or latency control modules.

Figure 3E:
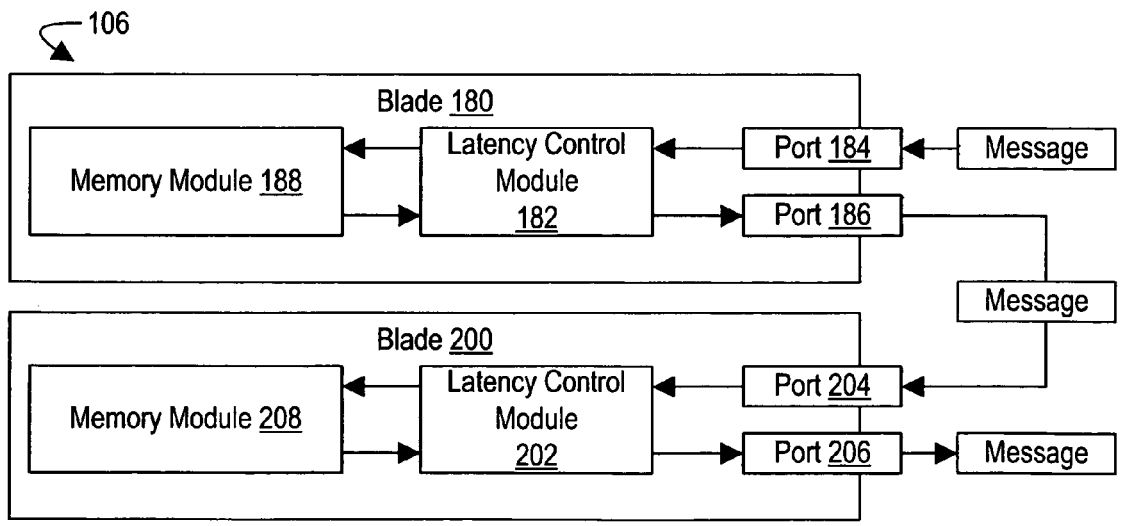
FIG. 3E is a block diagram illustrating yet another example of a latency control system shown in FIG. 1.

FIG. 3E is a block diagram of an embodiment of the latency control system 106 shown in FIG. 1, illustrating that two or more ports of two or more blades may be may be connected. As shown in FIG. 3E, a blade 200 may include a latency control module 202, ports 204 and 206, and a memory module 208. Accordingly, the latency control module 182 may receive a message via the port 184, which may be connected (or otherwise coupled) to a first node. The latency control module 182 may store the message in the memory module 188, may retrieve the message from the memory module 188, and may send the message (after all or a portion of a latency period has elapsed) via the port 186. The port 186 may be connected (or otherwise coupled to) the port 204. Accordingly, the latency control module 202 may receive the message via the port 204, may store the message in the memory module 208, may retrieve the message from the memory module 208, and may send the message (after all or a portion of a latency period has elapsed) via the port 206, which may be connected (or otherwise coupled to) a second node. Thus, the latency of a message may be increased using a plurality of latency control modules and/or a plurality of memory modules among a plurality of blades.

Figure 4:
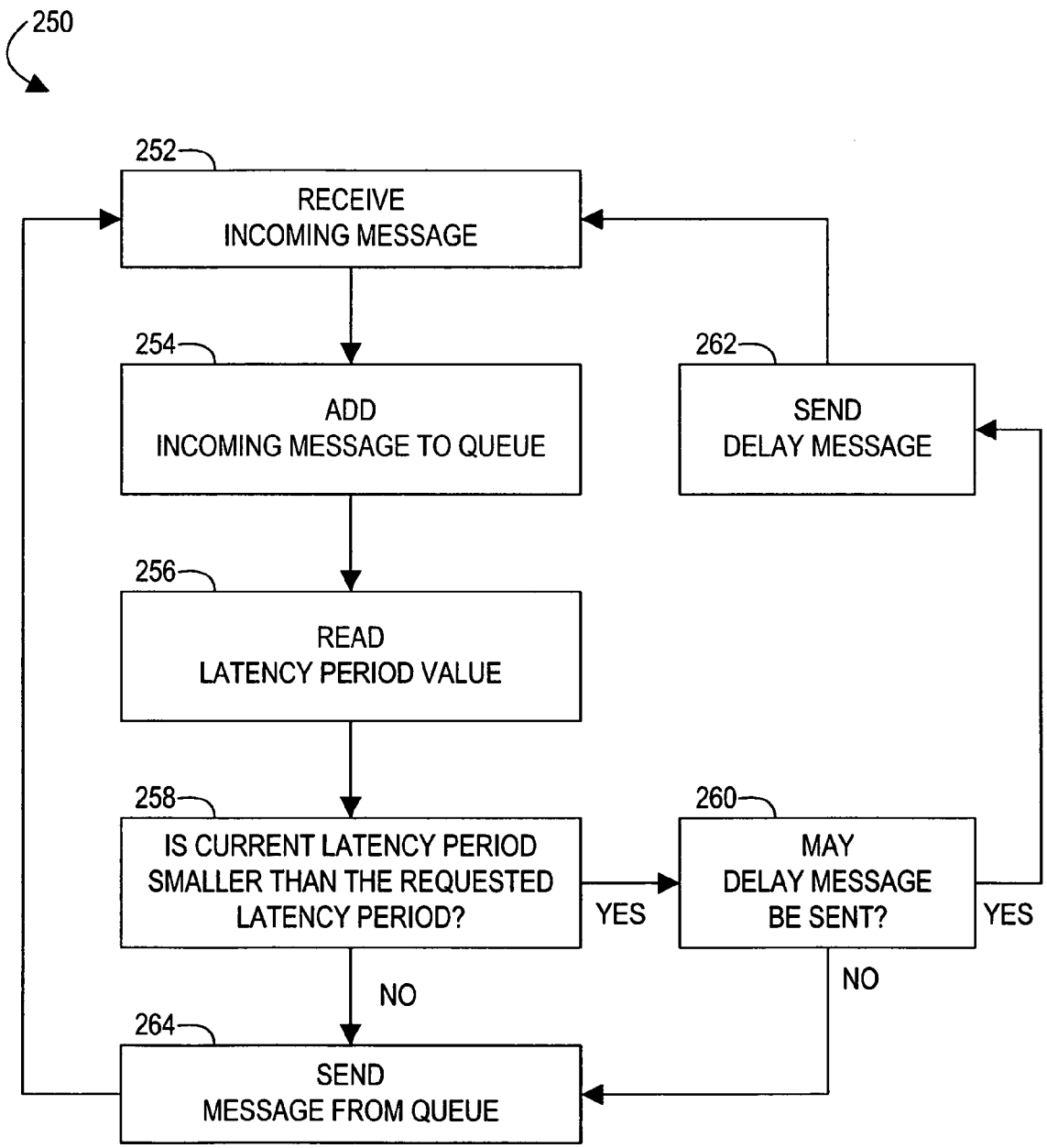
FIG. 4 is a flow chart of an embodiment of a method, which may be used to alter the latency of one or more network messages.

FIG. 4 is a flow chart of a method 250 for altering the latency of one or more network messages sent to and/or from nodes. As shown in FIG. 4, the method 250 may be used to increase the latency of one or more network messages. Specifically, one or more incoming messages or portions of messages may be received into a queue or other suitable data structure. Accordingly, as more messages or portions of messages are received into the queue, the queue's length grows, while one or more delay messages are sent before sending and/or purging a message or portion of a message from the queue. Eventually, the length of the queue may correspond to a desired latency. If desired, when the length of the queue corresponds to a desired latency, a message or portion of a message may be sent from the queue for each message or portion of a message that is received into the queue.

Referring to FIGS. 3A and 4, at block 252, the latency control module 182 determines whether there is an incoming network message to receive via, for example, the port 184. At block 254, the latency control module 182 may add the incoming message to a queue, or other suitable data structure, in the memory module 188. In one embodiment, the latency control module 182 may use an appropriate compression technique to compress a message added to the queue.

Referring to FIGS. 3A and 4, at block 256, the latency control module 182 may read, receive, or otherwise access, a latency period value. Because the latency period value may preferably change dynamically, the latency control module 182 may receive, or otherwise access, a latency period value one or multiple times in any particular loop, if desired. At a block 258, the latency control module 182 may determine if the current latency period is smaller than the requested latency period for the priority message (such as, the message at the front of queue, the message having the highest priority in the queue, or the like).

If, at the block 258, the current latency period is smaller than the requested latency period for the priority message in the queue, the latency control module 182 may determine, at a block 260, whether a delay message may be sent.

A variety of delay messages (that is, network messages that may be sent to delay the delivery of a network message or a portion of a network message) may be sent. Exemplary embodiments of delay messages may include primitives or ordered sets; however, delay messages may comprise other suitable messages. In one embodiment, the delay message may comprise a repeated (or otherwise redundant) version of the priority message or may comprise any other message under a protocol. For example, a protocol may define whether a certain network message may be repeated and, if so, how many times that message may be repeated. Accordingly, at the block 260, the latency control module 182 may determine whether the priority message may be repeated one or more times (as a delay message). Also, in one embodiment, the delay message may comprise a message other than the priority message. For example, a protocol may define when one or more messages (such as, an Idle or other ordered set) may be sent or repeatedly sent. Accordingly, at the block 260, the latency control module 182 may determine whether a network message other than the priority message may be sent one or more times (as a delay message). Of course, a variety of any other suitable messages may be sent to delay delivery of a network message or portion thereof.

If, at the block 260, the latency control module 182 determines that one or more delay messages may be sent, the latency control module 182 may send one or more delay messages via the port 186 at the block 262. If, at the block 260, the latency control module 182 determines that a delay message may not be sent, the latency control module 182 may, at the block 264, send the priority message via the port 186 and proceed to a block 254. If appropriate, the latency control module 182 may, at the block 264, use an appropriate decompression technique to decompress a message added to the queue.

If, at the block 258, the current latency period is not smaller than the requested latency period for the priority message in the queue (for example, the latency period has been reached for the priority message in the queue), the latency control module 182 may, at the block 264, send the priority message via the port 186, purge the priority message from the queue, and proceed to the block 252.

The method 250 may accommodate network messages of a variety of sizes, types, and configurations. Depending on the particular configuration of the networking system 100 and/or a particular protocol used therein, an incoming message, a priority message, and/or a delay message may have the same, similar, or different sizes. For example, in one embodiment, an incoming message may be a 10-bit transmission character (which may be an entire network message or merely a portion of a network message), and the priority message may be a 10-bit transmission character (which may be an entire network message or merely a portion of a network message). In some instances, a protocol might require that the transmission characters of a network message be sent sequentially. Accordingly, in one embodiment, the latency control module 182 may determine whether the priority message comprises a portion of a network message and whether at least a portion of that message has already been sent, at the block 260. If the latency control module 182 determines that the priority message comprises a portion of a network message and that at least a portion of that message has already been sent, the latency control module 182 may determine that a delay message may not be sent and may proceed to the block 264 to send the priority message. Of course, the latency control module 182 may determine that a delay message may or may not be sent for a variety of other reasons, depending, for example, upon the particular protocol used and the size, type, and configuration of the network messages.

Figure 5:
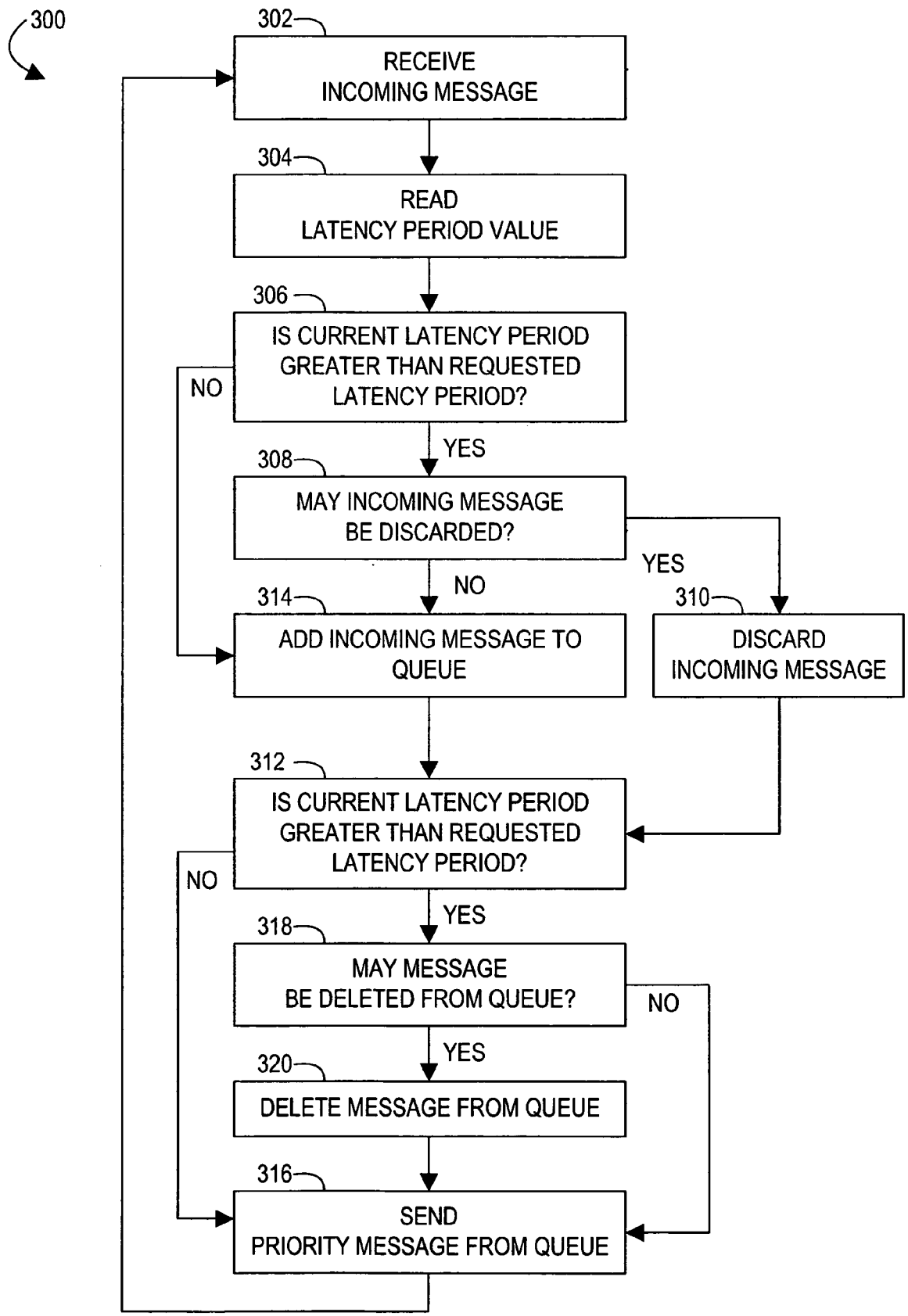
FIG. 5 is a flow chart of an embodiment of a method, which may be used to alter the latency of one or more network messages.

FIG. 5 is a flow chart of a method 300 for altering the latency of one or more network messages sent to and/or from nodes. As shown in FIG. 5, the method 300 may be used to decrease the latency of one or more network messages. Specifically, one or more incoming messages or portions of messages may be received into a queue or other suitable data structure. Accordingly, as more messages or portions of messages are received into the queue, the queue's length grows, while one or more delay messages are sent before sending and/or purging a message or portion of a message from the queue. Eventually, the length of the queue may correspond to a desired latency. However, in some instances, it may desirable to subsequently reduce the length of the queue to correspond a lower latency. Accordingly, one or more messages or portions of messages may be deleted from the queue to reduce the size of the queue. Also, one or more incoming messages or portions of messages may be discarded rather than added to the queue. Consequently, the length of the queue may be reduced to implement the desired latency. Of course, incoming and outgoing messages or portions of messages may be processed in other suitable manners.

Referring to FIGS. 3A and 5, at block 302, the latency control module 182 may receive an incoming network message via, for example, the port 184. At block 304, the latency control module 182 may read, receive, or otherwise access, a latency period value. Because the latency period value may preferably change dynamically, the latency control module 182 may receive, or otherwise access, a latency period value one or multiple times in any particular loop, if desired.

Referring to FIGS. 3A and 5, if, at block 306, it is determined that the current latency period is greater/longer than the requested latency period, the latency control module 182 may determine, at block 308, whether an incoming message may be discarded. If the incoming message may be discarded, the latency control module 182 may discard the incoming message at the block 310 and proceed to block 312. If incoming message may not be discarded, the latency control module 182 may, at block 314, add the incoming message to a queue (or other suitable data structure) in the memory module 188 or the like and may proceed to the block 312. In one embodiment, the latency control module 182 may use an appropriate compression technique to compress a message added to the queue.

As shown in FIG. 5, at blocks 306 and 312, the latency control module 182 may determine whether the current latency period is greater/longer than the requested latency period for the priority message in the queue. For example, the latency control module 182 may determine whether the length of the queue has been sufficiently reduced to correspond to the latency period associated with the latency period value.

If, at the block 312, the current latency period is not greater/longer than the requested latency period (for example, the latency period has been reached for the priority message in the queue), the latency control module 182 may, at block 316, send the priority message via the port 186 or the like, purge the priority message from the queue, and proceed to the block 302. If appropriate, the latency control module 182 may, at the block 316, use an appropriate decompression technique to decompress a message added to the queue.

If, at the block 312, the current latency period is greater than the requested latency period for the priority message in the queue (for example, the latency period has not been reached for the priority message in the queue), the latency control module 182 may, at the block 318, determine whether one or more messages may be deleted, removed, sent, or otherwise purged from the queue. A variety of messages may be purged from a queue. In one embodiment, a message may comprise a repeated or otherwise redundant message under a protocol. For example, a protocol may define whether a certain network message may be repeated and, if so, how many times that message may be repeated. Accordingly, at the block 318, the latency control module 182 may determine whether a repeated or otherwise redundant message may be deleted.

Of course, a variety of any other messages or portions of messages may be deleted in other suitable situations.

If, at the block 318, a message may not be purged from the queue, the latency control module 182 may, at the block 316, send the priority message via the port 186, purge the priority message from the queue, and proceed to the block 302.

If, at the block 318, one or more messages may be purged from the queue, the latency control module 182 may, at the block 320, purge the one or more messages from the queue and may, at the block 316, send the priority message via the port 186, purge the priority message from the queue, and proceed to the block 302. It will be appreciated that the priority message and/or one or more other messages in the queue may be purged at the block 320. Accordingly, where the priority message is purged at the block 320, a non-purged message of the highest priority in the queue may become the priority message for the block 316. In one embodiment, one or more messages may be purged from the queue by using a suitable compression-related technique whereby the compression no longer indicates that the one or more messages are present. For example only and not to limit the scope of the invention, where the compression indicates that 50 Idles are present, the compression might be altered to indicate that 20 Idles are present. Of course, one or more messages could be purged from the queue in any other suitable fashion.

The method 300 may accommodate network messages of a variety of sizes, types and configurations as described with reference to FIG. 4.

FIGS. 6A-6D, 7A-7C, 8A-8B, 9A-9B, and 10A-10B are block diagrams illustrating an embodiment of a queue, which may be implemented using a read pointer 340, a write pointer 342, and a buffer within a memory module (such as, the memory module 188) or the like. As shown in FIGS. 6A-6D, 7A-7C, 8A-8B, 9A-9B, and 10A-10B, the queue may be used to alter the latency associated with one or more network messages (or portions of networks messages).

Figure 6A:
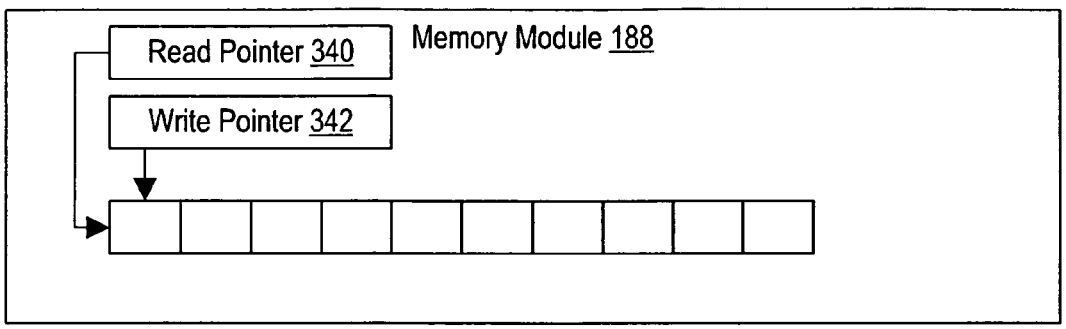
FIGS. 6A-D 7A-C, 8A-B, 9A-B, and 10A-B are block diagrams illustrating embodiments of a buffer, which may be used to alter the latency of one or more network messages.
Figure 6B:
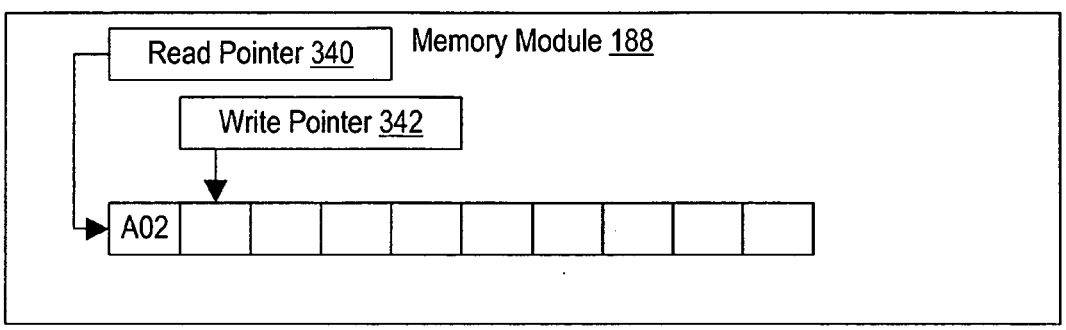
Figure 6C:
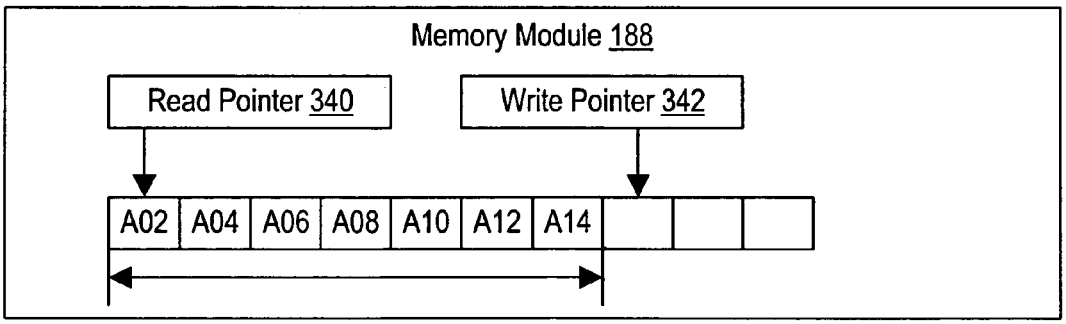

In one embodiment, a queue may be used to increase the latency associated with one or more network messages. For example, referring to FIGS. 3A and 6A, the latency control module 182 may point the read pointer 340 and the write pointer 342 to the first position of a buffer in the memory module 188. The latency control module 182 may receive a network message (such as, a 10-bit transmission character), may store the received network message at the location pointed to by the write pointer 342, and may update the write pointer 342 to point to the next position in the buffer—as shown in FIG. 6B. As shown in FIG. 6C, the latency control module 182 may receive a series of one or more network messages, may repeatedly store the received network messages at the location pointed to by the write pointer 342, and may repeatedly update the write pointer 342 accordingly—as shown in FIG. 6C. Thus, as the latency control module 182 stores more messages in the buffer and optionally sends one or more delay messages, the number of messages in the buffer grows. Eventually, the number of messages in the buffer may correspond to a desired latency (as indicated by the arrowed line in FIG. 6C). In one embodiment, when the length of the queue corresponds to a desired latency, a message may be sent from the queue for each message that is received into the queue.

Figure 6D:
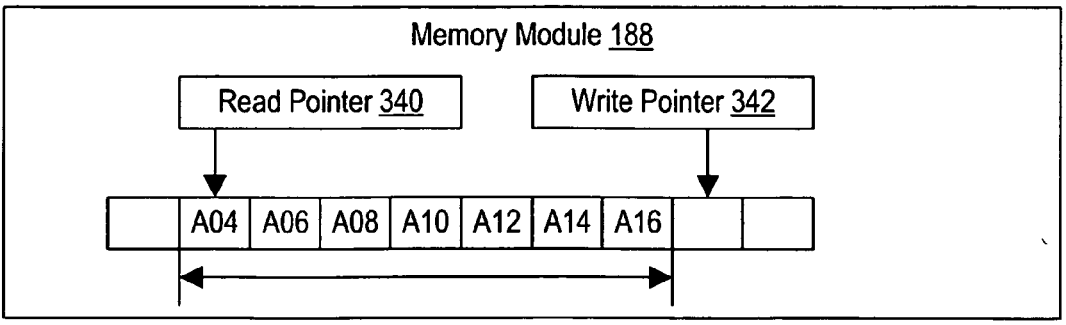

For example, as shown in FIGS. 6C and 6D, the latency control module 182 may (in a desired period, such as, a clock cycle) receive a message A16, store the message A16 at the location indicated by the write pointer 342, update the write pointer 342, retrieve the message A02 from the location indicated by the read pointer 340, send the message A02 to its destination (such as, to a node), purge the message A02 from the buffer, and update the read pointer 340. Of course, the latency control module 182 may perform some or all of these functions in the same clock cycle, during different clock cycles, or according to any other suitable schedule.

Figure 7A:
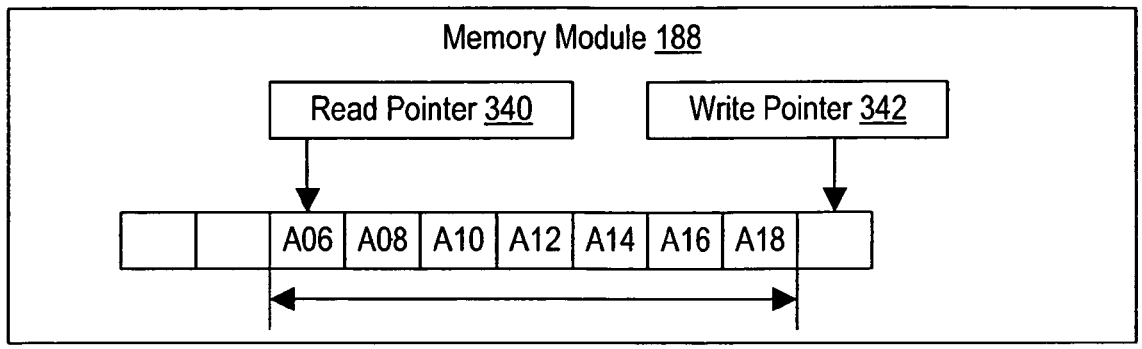
Figure 7B:
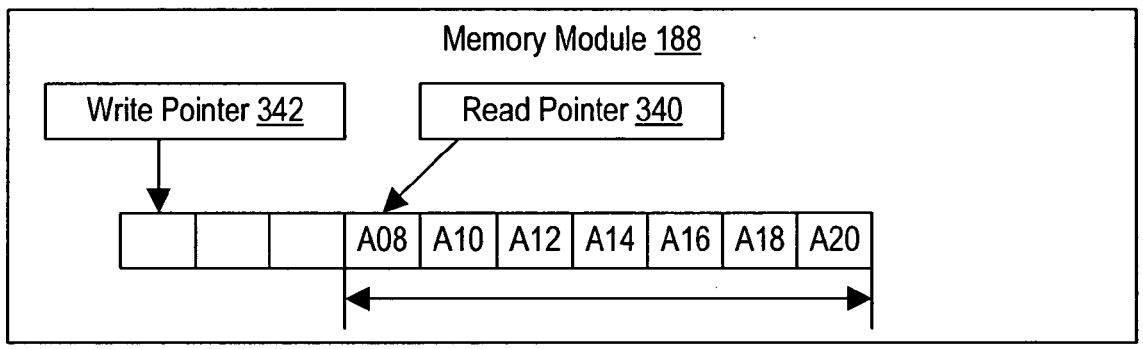
Figure 7C:
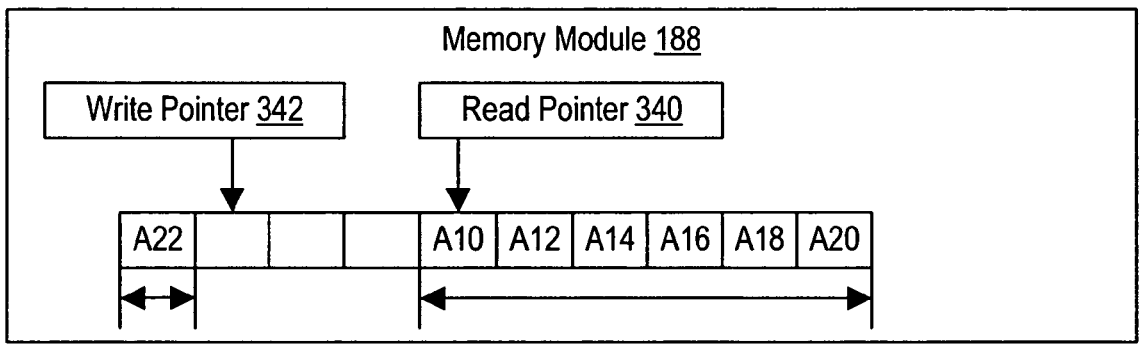

In one embodiment, a queue may be implemented using a wrap-around or circular buffer. For example, referring to FIG. 6D, the latency control module 182 may continue to receive and send messages until the write pointer 342 points to the last position in the buffer (as shown in FIG. 7A) and then to the first position in the buffer (as shown in FIG. 7B), where the latency control module 182 may continue to receive and send messages (as shown in FIG. 7C).

Figure 8A:
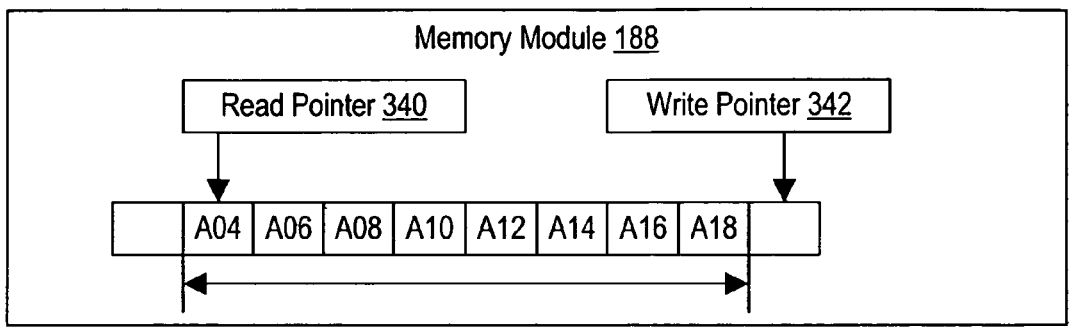
Figure 8B:
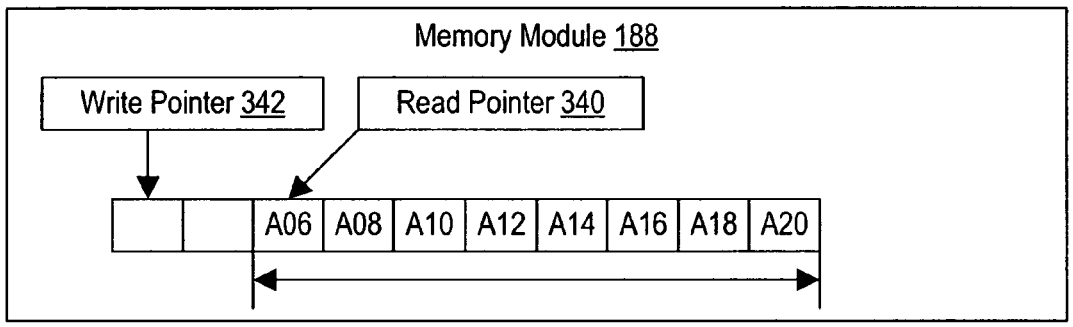

In one embodiment, a queue may be used to dynamically increase the latency associated with one or more network messages. For example, referring to FIG. 6D, the latency control module 182 may store a received message A18 in the buffer and may optionally send a delay message to increase the number of messages stored in the buffer (as shown in FIG. 8A). Afterwards, if desired, a message may be sent from the queue for each message that is received into the queue, (as shown in FIG. 8B).

Figure 9A:
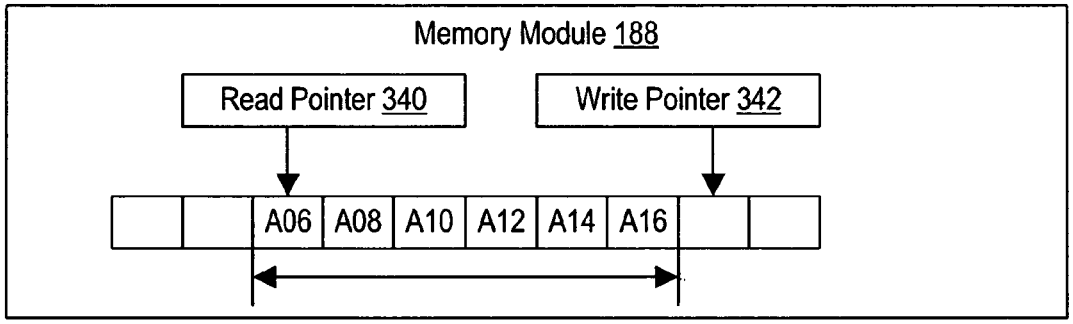
Figure 9B:
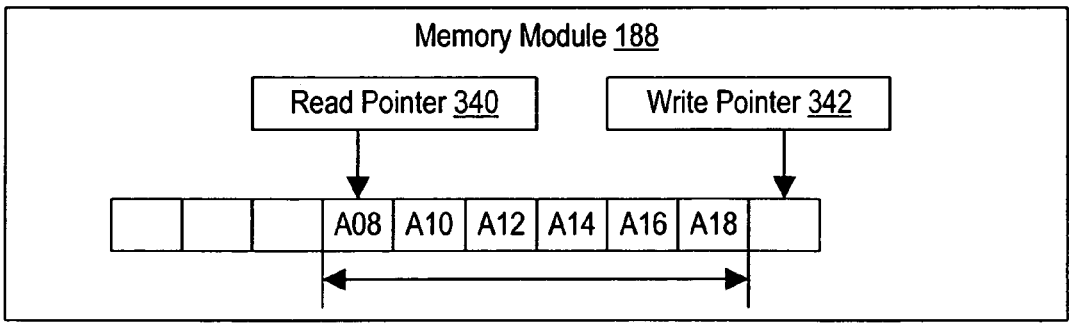

In one embodiment, a queue may be used to dynamically decrease the latency associated with one or more network messages by discarding one or more incoming messages. For example, referring to FIG. 6D, the latency control module 182 may send the message A04 and discard an incoming message (not shown) to decrease the buffer's length as shown in FIG. 9A. Afterwards, if desired, a message may be sent from the queue for each message that is received into the queue, (as shown in FIG. 9B).

Figure 10A:
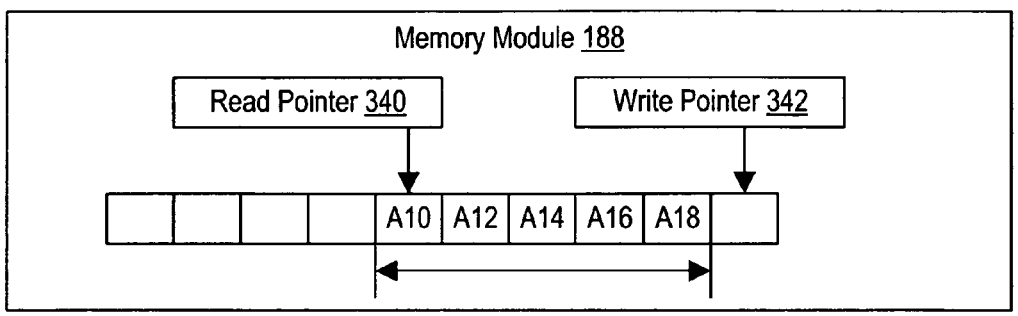
Figure 10B:
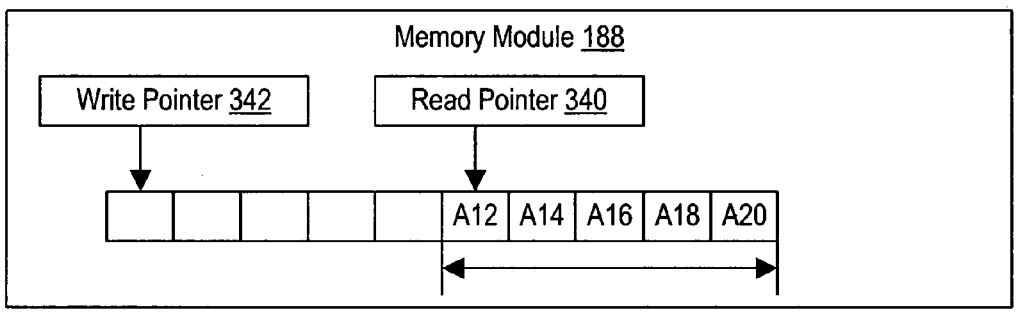

In one embodiment, a queue may be used to dynamically decrease the latency associated with one or more network messages by purging one or more messages from a buffer. For example, referring to FIG. 6D, the latency control module 182 may send the message A04, discard the messages A06 and A08, and may store a received message A18 in the buffer to decrease the buffer's length as shown in FIG. 10A. Afterwards, if desired, a message may be sent from the queue for each message that is received into the queue, (as shown in FIG. 10B). One of skill in the art can appreciate that incoming and outgoing messages or portions thereof may be processed in other suitable manners.

It will be appreciated that the latency control module 182 may be used to implement a variety of devices. For example, FIGS. 11A, 11B, 11C, and 11D are block diagrams illustrating various embodiments of the latency control system 106 shown in FIG. 1.

Figure 11A:
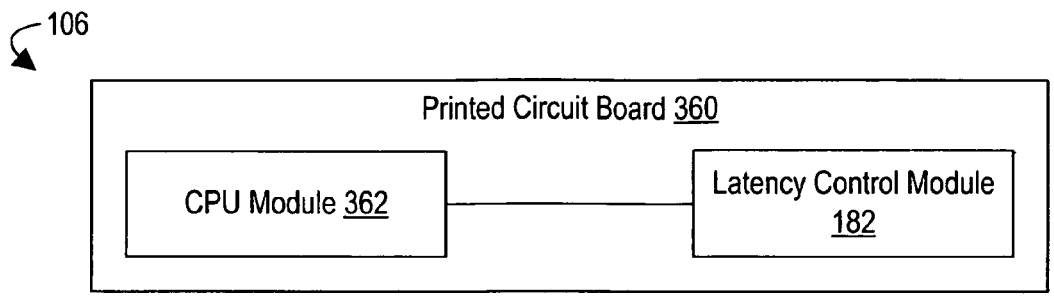
FIG. 11A is a block diagram of an embodiment of the latency control system shown in FIG. 1.

As shown in FIG. 11A, the latency control system 106 may comprise printed circuit board 360 including the latency control module 182 and a CPU module 362. The CPU module may be configured to provide any suitable processing functions. Depending on the particular configuration, the printed circuit board 360 may include any suitable combination of one or more CPU modules, one or more latency control modules, and/or one or more memory modules.

Figure 11B:
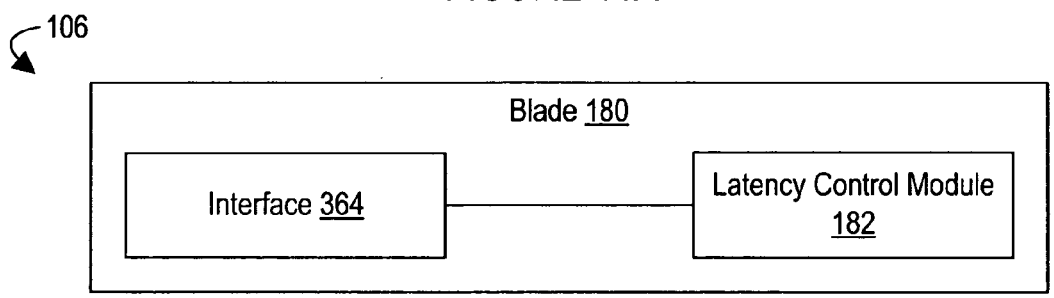
FIG. 11B is a block diagram of an embodiment of the latency control system shown in FIG. 1.

As shown in FIGS. 3A and 11B, the latency control system 106 may comprise one or more blades (such as, the blade 180). The blade 180 may include an interface adapted to interface with a CPU module of a computing system, such as, a CPU module 366 of the chassis computing system 368 shown in FIG. 11C.

Figure 11C:
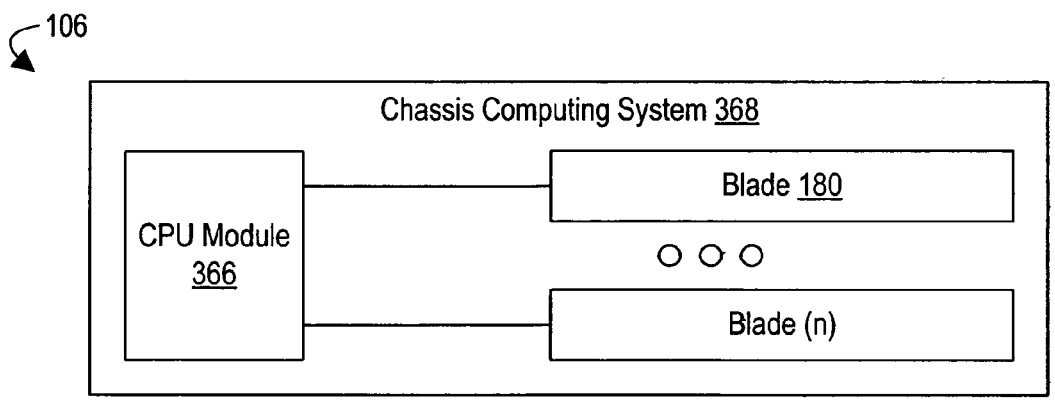
FIG. 11C is a block diagram of an embodiment of the latency control system shown in FIG. 1.

As shown in FIG. 11C, a chassis computing system may include a CPU, which may be adapted to interface with one, two, or more blades or other printed circuit boards.

Figure 11D:
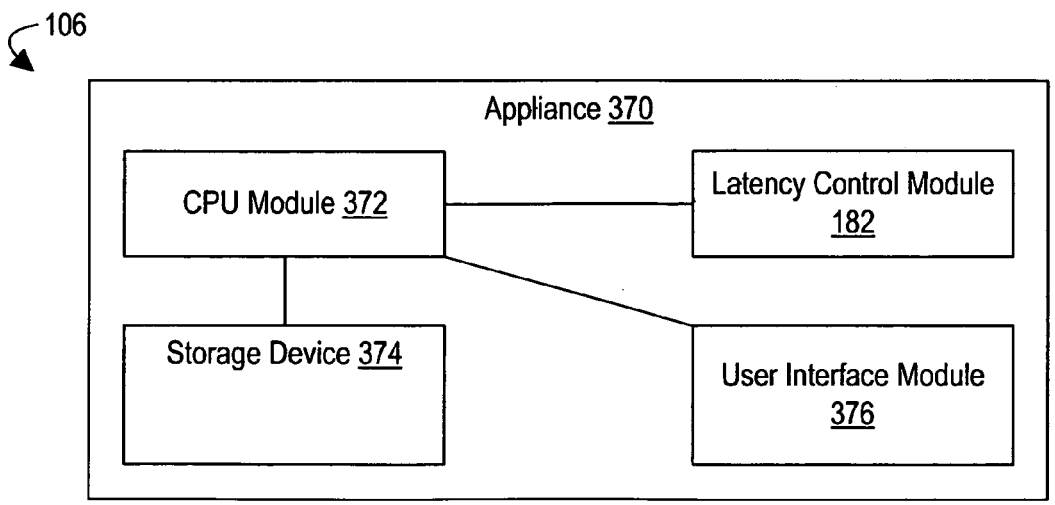
FIG. 11D is a block diagram of an embodiment of the latency control system shown in FIG. 1.

As shown in FIG. 11D, an appliance (such as, an appliance 370) may comprise a latency control module (such as, the latency control module 182). Depending on the particular configuration, the appliance 370 may include any suitable combination of one or more CPU modules (such as, a CPU module 372), one or more latency control modules, and/or one or more memory modules. In one embodiment, an appliance may include and/or be in communication with one or more storage devices (such as, a storage device 374), which may advantageously be used for storing any suitable diagnostic information, statistics, and the like. In one embodiment, an appliance may include and/or be in communication with one or more user interface modules (such as, a user interface module 376), which may advantageously be used for displaying information to a user, receiving user input, or both. The appliance may be network attached, which may facilitate remote control and/or remote access. The appliance may also include and/or be in communication with one or more display devices (such as, a monitor) adapted to display information, one or more user input devices (such as, a keyboard, a mouse, a touch screen, and the like) adapted to receive user input, or both.

In one embodiment, a latency control system (such as, the latency control system 106) may comprise a "playback" system in which one or more network messages may be stored in one or more memory modules (such as, the memory module 188) to be sent at a later time. Accordingly, the one or more network messages may be sent (or "played back") at any suitable time and, if desired, in response to user input. Advantageously, this may be useful in connection with one or more jammers and/or other diagnostic devices, such as those described herein.

The methods and systems described above can be implemented using software and/or hardware. The software and/or hardware include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hard-wired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network that includes one or more nodes, a system for altering the latency of at least one network message sent and received by the one or more nodes, the system comprising:

an apparatus including:
a memory module; and
a latency control module configured to adjust a latency of at least one network message sent from a first node to a second node, wherein the latency control module is configured to receive one or more network messages from the first node and store the one or more network messages in the memory module for a latency period defined by a latency period value, wherein the latency control module is configured to retrieve the one or more network messages from the memory module and send the one or more network messages to the second node after the latency period has elapsed;
wherein the latency control module is configured to store the one or more network messages in the memory module by adding the one or more network messages to a message queue in the memory module; and
wherein the latency control module is configured to, before sending the one or more network messages to the second node, send delay messages to the second node until a length of the message queue corresponds to the latency period.

2. The system as in claim 1, wherein the latency control module is configured to dynamically increase the latency of the one or more network messages.

3. The system as in claim 1, wherein the latency control module is configured to dynamically decrease the latency of the one or more network messages.

4. The system as in claim 1, wherein the latency period value is derived from at least one of:
at least a portion of a network;
a bandwidth;
a transmission rate;

a length of a communications medium; and a networking protocol.

5. The system as in claim 1, wherein the system further comprises a printed circuit board connected with the memory module and with the latency control module.

6. The system as in claim 5, wherein the system further comprises a chassis computer system adapted to receive one or more printed circuit boards and wherein at least one of the one or more printed circuit boards includes the memory module and the latency control module.

7. The system as in claim 1, wherein the system further comprises an appliance, the appliance including the memory module and the latency control module.

8. The network diagnostic system as in claim 1, wherein the first node comprises at least one of the following: a server, a host, a client, a storage device, a switch, a hub, a router, at least a portion of a Storage Area Network fabric, a diagnostic device, a device adapted to receive a signal over a network and a device adapted to send a signal over the network; and wherein the second node comprises at least one of the following: a server, a host, a client, a storage device, a switch, a hub, a router, at least a portion of a Storage Area Network fabric, a diagnostic device, a device adapted to receive a signal over a network and a device adapted to send a signal over the network.

9. In a network that includes one or more nodes that send and receive network messages, a method for altering a latency of one or more network messages, the method comprising:

receiving a first set of one or more network messages from a first node at a latency control module;

storing the first set of one or more network messages in a memory module that includes a message queue;

receiving a first latency period value that identifies a first latency for the first set of one or more network messages;

sending delay messages to a second node until a length of the message queue corresponds to the first latency; and sending the first set of one or more network messages to the second node as the first latency lapses for each of the first set of one or more network messages;

wherein the sending delay messages to the second node until the length of the message queue corresponds to the first latency further comprises:

sending the delay messages before sending the first set of one or more network messages to increase the latency of the first set of one or more network messages to the first latency.

10. A method as in claim 9, wherein the sending delay messages to the second node until the length of the message queue corresponds to the first latency further comprises:

altering the length of the message queue to account for the first latency.

11. A method as in claim 9, further comprising:

receiving a second latency period value that identifies a second latency.

12. A method as in claim 11, further comprising.

discarding one or more network messages from the message queue to decrease the latency of at least one network message within the message queue.

13. A method as in claim 11, further comprising.

receiving a second set of two or more network messages from the first node at the latency control module;

discarding at least one of the second set of network messages to decrease the latency of at least one other of the second set of network messages; and storing the at least one other of the second set of network messages in the memory module that includes the message queue after discarding the at least one of the second set of network messages.

* * * * *